United States Patent [19]

Araki et al.

[11] 4,134,810

[45] Jan. 16, 1979

[54] PROCESS FOR PREPARING A HEAT-CURABLE POLYMER EMULSION USING HIGH ENERGY RADIATION

[75] Inventors: Kunio Araki, Takasaki; Keizo Makuuchi, Sakai; Tohru Takagi, Hiratsuka, all of Japan

[73] Assignee: Japan Atomic Energy Research Institute, Tokyo, Japan

[21] Appl. No.: 785,091

[22] Filed: Apr. 6, 1977

[30] Foreign Application Priority Data

Apr. 8, 1976 [JP] Japan .................................. 51-39601
Apr. 19, 1976 [JP] Japan .................................. 51-44724

[51] Int. Cl.² .......................... C08F 8/00; C08F 2/46; C08F 4/00
[52] U.S. Cl. ....................... 204/159.15; 204/159.14; 204/159.16; 204/159.17; 204/159.19; 204/159.23; 204/159.24; 260/29.4 UA; 260/29.6 NR; 260/29.6 MN; 260/836; 260/837 R; 260/856; 260/885; 427/54; 428/417; 428/441; 428/442; 526/16; 526/49

[58] Field of Search ............... 260/29.6 NR; 204/159.15, 159.16, 159.17, 159.22, 159.23, 159.19, 159.14

[56] References Cited

U.S. PATENT DOCUMENTS

| 3,923,704 | 12/1975 | Gunning et al. ................. 260/2.5 N |
| 3,935,330 | 1/1976 | Smith et al. ............................ 427/41 |
| 4,025,407 | 5/1977 | Chang et al. .................... 204/159.14 |

*Primary Examiner*—Richard B. Turer
*Attorney, Agent, or Firm*—Browdy and Neimark

[57] ABSTRACT

The properties of a thermosetting polymer emulsion can be improved by irradiation with an ionizing radiation.

By adding a specific amount of lipophilic polyfunctional monomer to a thermosetting polymer emulsion and irradiating with an ionizing radiation, the properties of the thermosetting polymer emulsion can be improved regardless of the type of thermosettable polymer constituting the emulsion. The thermosetting polymer emulsion of which properties are improved by this invention can form a film having excellent water-resistance, chemical resistance and toughness.

6 Claims, No Drawings

PROCESS FOR PREPARING A HEAT-CURABLE POLYMER EMULSION USING HIGH ENERGY RADIATION

BACKGROUND OF THE INVENTION

(1) FIELD OF THE INVENTION

This invention relates to a process for improving the properties of polymer emulsions.

(2) Description of the Prior Art

Increasing social demands for the prevention of environmental pollution and the saving of resources has tended to restrict the use of organic solvents in recent years. Therefore, the availability of polymer emulsions using water as a medium has been noted in fields formerly using large amounts of organic solvents such as coatings, adhesives and so forth. Furthermore, the polymer emulsion has the significant characteristics that it can be easily synthesized and, in addition, easily handled because its viscosity is much lower than that of the polymer solution having the same concentration. Therefore, polymer emulsions such as acrylic resin emulsions, polyvinyl acetate emulsions, ethylene-polyvinyl acetate copolymer emulsions and the like are used in a wide variety of applications, for example not only as coatings and adhesives but also as tackifiers finishing and treating agents for paper, fibers, woven fabrics leather, etc., and also as bonding agents for nonwoven materials.

However, films obtained by drying such emulsions cannot eliminate the important defect that such films easily absorb moisture and swell and consequently their physical properties and adhesion to substrates fall remarkably. And furthermore, as is clear from the film-forming process, the film is one in which the polymer particles are coalesced, and it is, therefore, inferior to solvent-cast film in physical properties, especially, strength and toughness. For these reasons, the conventional polymer emulsion was unsatisfactory for the applications mentioned above.

In order to eliminate the defects of the conventional polymer emulsion, a thermosetting acrylic emulsion has been proposed comprising copolymer containing ionic reactive acrylic monomer and crosslinking agent bringing about ionic addition reaction or condensation reaction. It is reported that this type of thermosetting polymer emulsion forms a tough film by reacting the functional group in the copolymer with an ionic crosslinking agent at the time of drying the thermosetting polymer emulsion on heating.

However, since the monomer having ionic reactive functional group is, in general, strongly hydrophilic, the ionic functional group is apt to be localized on the surface of the copolymer. And furthermore, the ionic crosslinking agent is added in the form of water solution or o/w emulsion, and therefore, the crosslinking reaction at the time of drying by heating is restricted to the surface of the copolymer particles, and accordingly, the degree of crosslinking of the interior of the copolymer particles is extremely low. Therefore, an excess of the crosslinking agent must be used, which causes the formation of rigid and brittle film.

A thermosetting polymer emulsion free from the various defects mentioned above has, therefore, long been desired by those skilled in the art.

SUMMARY OF THE INVENTION

As a result of study for the elimination of the defects of the thermosetting polymer emulsion mentioned above, the inventors have found that the viscosity and film-forming properties of the emulsion are not impaired if a thermosetting polymer emulsion containing at least one radiation-crosslinkable polymer is irradiated with an ionizing radiation and, further, the film formed from such irradiated emulsion is significantly improved in such physical properties as water resistance, chemical resistance and toughness. They have also found that addition of a specific amount of the lipophilic polyfunctional monomer to the thermosetting polymer emulsion, comprising any type of thermosetting resin, before said irradiation, does not affect the reactive functional group or thermosetting reaction and that the film formed from the emulsion so treated, when dry, has improved resistance to water and chemicals and has improved toughness.

Therefore, one object of this invention is to provide a novel process for improving the properties of a polymer formed from a heat curable polymer emulsion.

And one object of this invention is to provide a novel process for improving the properties of a thermosetting polymer emulsion characterized by irradiating said emulsion with an ionizing radiation.

Still another object of this invention is to provide a novel process for improving the properties of a thermosetting polymer emulsion comprising radiation-crosslinkable or disintegratable polymer characterized by adding a specific amount of a lipophilic polyfunctional monomer to said emulsion and irradiating it.

A further object of this invention is to provide a novel process for producing a thermosetting polymer emulsion which can form a film in which water-resistance, chemical-resistance and toughness are significantly improved.

These and other objects as well as advantages of this invention will become apparent from the detailed description.

DETAILED DESCRIPTION OF THE INVENTION

This invention relates to a process for improving the properties of a polymer emulsion, and more particularly to a process for improving the properties of a thermosetting polymer emulsion characterized by irradiating with an ionizing radiation the thermosetting polymer emulsion or one to which a specific amount of lipophilic polyfunctional monomer has been added.

The most important feature of this invention resides in that a crosslinking of the interior of polymer particles constituting the polymer emulsion can be carried out while in a state of emulsion by irradiating said emulsion with an ionizing radiation, which is difficult to accomplish by the conventional heat-curing. And another important feature of this invention resides in adding a specific amount of lipophilic polyfunctional monomer to a thermosetting polymer emulsion and irradiating said emulsion with an ionizing radiation to crosslink the interior of the polymer particles constituting said emulsion.

It has been conventionally thought in the art that it is preferable to carry out the crosslinking reaction immediately before or after the emulsion is formed into a film rather than crosslinking the polymer while in the state of an emulsion. In other words, it has been thought that if the polymer is crosslinked while in the state of an emulsion, the glass transition temperature of the polymer will rise to make the coalescence of polymer particles, in the film-forming step very difficult, and therefore, a dense and uniform film cannot be easily formed. In accordance with this invention, however, even when the interior of the polymer particles constituting the polymer emulsion is highly crosslinked by irradiation with an ionizing radiation, the dispersal-stability, film-forming property and fluidity of the polymer emulsion are not impaired, and the thus treated polymer emulsion can form a film as dense and uniform as that obtained from a non-irradiated polymer emulsion and which has significantly improved water-resistance, chemical-resistance and toughness. A still more important feature of this invention is that the curing of the thermosetting polymer emulsion can be effected at a lower curing temperature and in a shorter curing time, and, in addition, the amount of polymeric crosslinking agent to be added to the polymer emulsion, if it is required, can also be reduced.

Next, the irradiation crosslinking of the polymer in the form of a film has several disadvantages compared to irradiation of the polymer in the form of an emulsion; (a) it is very difficult to crosslink the polymer in the form of a film by irradiation, because the radiation can not reach throughout the film applied to an article of complicated shape or configuration; (b) shielding is required for the irradiation of polymer in the form of a film; on the other hand, irradiation of polymer in emulsion form can be carried out, in situ, and does not require shielding; (c) the polymer entirely crosslinked in emulsion form by irradiation can not be applied to a substrate, because the polymer thus treated loses fluidity. On the other hand, when the interior of polymer particles in the emulsion is highly crosslinked by irradiation, the emulsion does not lose fluidity, because the polymer particles are isolated in the emulsion; (d) the crosslinking by irradiation of the polymer in the film is apt to be inhibited by oxygen in air; (e) the total does of radiation required for highly crosslinking polymer in film form is about two times that required for irradiation an emulsion. For these reasons, this invention is of extreme importance to industry.

The polymer emulsion used in this invention is a thermosetting polymer emulsion in which intraparticle and interparticle crosslinking of the polymer particles constituting the emulsion can occur as a result of chemical reaction at the time of forming a film by heating. Representative polymers constituting the polymer emulsion are those containing the monomers listed in the right column having the functional groups specified in the left column of Table 1.

Table 1

| functional group | representative monomer |
| --- | --- |
| epoxide | glycidyl acrylate, glycidyl methacrylate, acrylglycidyl ether, |
| amino | Dimethylaminoethyl methacrylate, vinylpyridine, ter-butylaminoethyl methacrylate, acrylamide, methacrylamide, maleicamide, |
| anhydro carboxyl | maleic anhydride, itaconic anhydride, |
| carboxyl | acrylic acid, methacrylic acid, crotonic acid, itaconic acid, half ester of itaconic acid, maleic acid, half ester of maleic acid |
| hydroxyl | Allyl alcohol, monoallyl ester of polyhydric alcohol, 2-hydroxyethyl acrylate, 2-hydroxyethyl methacrylate, |

Table 1-continued

| functional group | representative monomer |
| --- | --- |
| N-methylol | N-methylolacrylamide, N-methylolmethacrylamide, |

In order to carry out a heat-curing reaction in accordance with the invention, the combinations of functional groups illustrated below are employed.
1. an epoxide with an amino
2. an epoxide with an anhydro carboxyl
3. an epoxide with a carboxyl
4. an epoxide with a hydroxyl
5. an epoxide with an N-methylol or N-methylol ester
6. an N-methylol or N-methylol ester with an N-methylol ester
7. an N-methylol with a carboxyl
8. an N-methylol with a hydroxyl
9. an N-methylol with an amino These two functional groups illustrated above required for the heat-curing reaction may be carried in the polymer emulsion in a single polymer (molecular) chain or in independent polymer chains.

The polymers having these functional groups may include the copolymers of the monomers having the functional groups illustrated in Table 1 and another radical polymerizable vinyl monomer. The radical polymerizable vinyl monomers are non-functional monomers, such as styrene, methyl methacrylate, ethyl methacrylate, butyl methacrylate, isobutyl methacrylate, vinyl chloride, vinyl acetate, acrylonitrile, hexyl methacrylate, lauryl methacrylate, methyl acrylate, ethyl acrylate, butyl acrylate, isobutyl acrylate, 2-ethyl hexyl acrylate, ethylene, octadecyl methacrylate, etc.

A mixture of (a) a copolymer of a monomer having a functional group and a monomer having no functional group with (b) a copolymer of a monomer having another functional group and a monomer having no functional group may be used. And a terpolymer of a monomer having a functional group, a monomer having another functional group and a monomer having no functional group may also be used in accordance with this invention. The kind of monomer having no functional group to be used and the proportion of the monomer having a functional group to the monomer having no functional group in the aforesaid copolymer should be determined depending on the characteristics desired in the polymer emulsion; but, in general, the monomer having a functional group may be used in the range of 3% to 30% by weight on the basis of the weight of the monomer having no functional group.

It is also possible to make use of a functional group contained in the polymer as one functional group and make use of a functional group contained in the polymeric crosslinking agent as the other different functional group. The polymeric crosslinking agents having a reactive functional group generally used are melamine resins such as hexamethoxymethylol melamine, butyl melamine resin etc., and condensation resin of bisphenol A with halohydrin, for example, "Epikote DK-225"(Shell International Chemicals Corp.) and so forth. However, as is clear from the aforementioned reaction mechanism, the low-molecular compounds having more than 2 reactive functional groups in one molecule such as diglycidyl ether, dimethylol urea, butadiene/dioxide, vinyl-cyclohexene dioxide, glyoxal, hexamethylene diamine etc. can be used in this invention.

The curing (heat-curing) conditions, that is, curing temperature and curing time, should be determined depending on the kinds of reaction, properties of the polymer used, the numbers of functional groups and so forth; for example, the curing reaction of a hydroxyl with an epoxide requires heating at a temperature above 100° C. for 30 minutes; on the other hand, the curing reaction of an epoxide with a hexamethylenediamine can be effected at about room temperature.

The term "heat-curing" as used in this invention means the crosslinking caused by chemical reaction between the reactive functional groups which is clearly distinguished from irradiation crosslinking. Representative curing reactions have already been illustrated in this specification; however, it is expected that additional curing reactions will be discovered with the advance of polymer chemistry and they will be regarded by those skilled in the art as being applicable in the process of this invention to thermosetting polymer emulsions. The term "radiation crosslinking" used in this invention means the combinations between the polymer molecular chains caused by recombination of polymer radicals formed directly or indirectly by irradiation and graft crosslinking by radical polymerization of polyfunctional monomer and the crosslinking by irradiation is restricted to the internal portions of the polymer particles.

The term "polymer emulsion" in the specification and the claims means, in general, thermosetting polymer emulsion and said emulsions are divided into two types according to the process for producing them. One type is obtained by emulsion-polymerizing one or more monomers and the other is obtained by emulsifying the polymer prepared by another polymerizing process. The process of this invention can be applied to the emulsion prepared by either method. Furthermore, the resins are divided into two types from the standpoint of the effects of irradiation; one is a radiation-crosslinkable polymer and the other is radiation-disintegratable. The radiation-crosslinkable polymer is a homopolymer of a radiation-crosslinkable monomer suhch as acrylic ester, vinyl acetate, ethylene, vinyl chloride, butadiene, styrene, vinyl fluoride, vinylidene fluoride, vinylidene chloride, VeoVa, etc., or a copolymer thereof or a copolymer comprised of more than 40% of radiation-crosslinkable monomer and less than 60% of a radiation-disintegratable monomer such as methacrylate, isoprene, tetrafluoroethylene, etc. However, the process of this invention can be applied not only to a radiation-crosslinkable polymer but also to a radiation-disintegratable polymer because of the use of the lipophilic polyfunctional monomer.

The radical polymerizable polyfunctional monomer used in this invention is a radical polyermizable and/or radical copolymerizable compound having more than two reactive carbon-to-carbon double or triple bonds in its molecule. And the lipophilic monomer is any monomer having low solubility in water at ordinary temperature and having good compatibility with the resin.

Representative lipophilic monomers are illustrated below but the invention is not limited thereto:

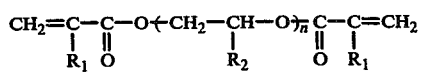 (a)

wherein $R_1$ and $R_2$ represent hydrogen or methyl group respectively, and n is a positive integer below 9.

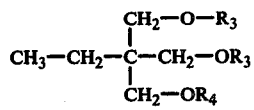 (b)

wherein $R_3$ is

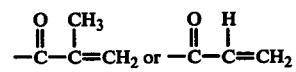

and $R_4$ is hydrogen or $R_3$.

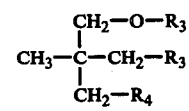 (c)

wherein $R_3$, $R_4$ are as defined in item (b).

 (d)

wherein $R_3$ is as defined in item (b) and n is a positive integer above 4.

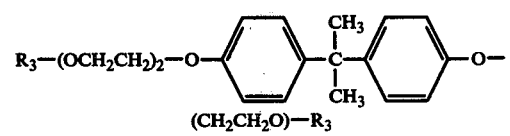 (e)

wherein $R_3$ is as defined in item (b).

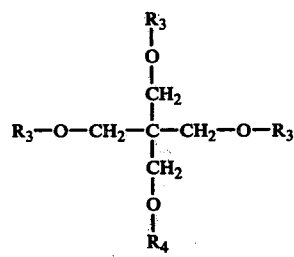 (f)

wherein $R_3$ and $R_4$ are as defined in item (b).

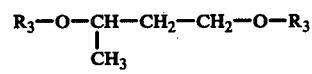 (g)

wherein $R_3$ is as defined in item (b).

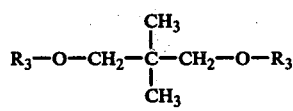 (h)

wherein $R_3$ is as defined in item (b).

(i) diallyl compounds such as diallyl maleate, diallyl fumarate, diallyl itaconate, diallyl phthalate, etc.
(j) triallyl compounds such as triallyl isocyanurate, triallyl cyanurate, triallyl trimellitate, etc.
(k) divinyl benzene.
(l) di or tripropargylic acid ester.

These polyfunctional monomers are used independently or in combination with each other in this invention. These polyfunctional monomers are preferably liquid at about room temperature; however, when they are solid and have a melting point below 60° C., they may be melted to be added to the heated emulsion. And when they are dissolved in a liquid polyfunctional monomer or proper solvent, it is not necessary to consider the melting points thereof.

The amount of polyfunctional monomer added to the thermosetting polymer emulsion is preferably from 0.01% to 20%, more preferably from 0.1% to 10% on the basic of weight of the thermosetting polymer emulsion. However, the optimum amount to be added should be determined by taking into consideration the characteristics of the polymer, such as composition, concentration, etc. That is to say, when the polymer is radiation-crosslinkable and its concentration in the polymer emulsion is below 10% less than 5% polyfunctional monomer is satisfactory; on the other hand, when the polymer is radiation-disintegratable and its concentration in the polymer emulsion is below 10%, more than 2% polyfunctional monomer is required. No special apparatus is necessary for the addition of the polyfunctional monomer to the thermosetting polymer emulsion; the polyfunctional monomer is easily poured into the thermosetting polymer emulsion and stirred adequately.

The ionizing radiation used in this invention may include electron beam, alpha rays, beta rays, gamma rays or X-rays. The choice of radiation source and the total dose of the radiation depend on the components of the thermosetting polymer emulsion, the concentration of the polymer in the polymer emulsion, the kind and the amount of the polyfunctional monomer to be added to the thermosetting polymer emulsion, the radiation atmosphere and temperature, the physical properties of the film to be obtained and the cost of the radiation apparatus.

In general, the total dose of the radiation may range from 0.1 Mrad to 50 Mrad, but a total dose in the range of from 1 Mrad to 10 Mrad is preferred, because when the total dose of the radiation is below 0.1 Mrad, the resin in the polymer emulsion can not be fully crosslinked and when it is more than 50 Mrad, the viscosity of the emulsion rises.

There are certain thermosetting polymer emulsions containing polyvinyl alcohol or cellulose derivatives, these latter being used as protective colloids for the resin. When this type of emulsion containing protective colloids is irradiated with a large total dose of ionizing radiation, the viscosity of the emulsion rises and makes the emulsion thicken to a pudding-like state in some cases. However, the addition of the polyfunctional monomer to the thermosetting polymer emulsion of this type reduces the total dose of the radiation required for crosslinking the interior of the polymer particles and this prevents the rise of the viscosity of the polymer emulsion.

Various kinds of auxiliaries, such as pigments, thickening agents, antiseptics, antifoamers, pH-adjustors, etc., may be added to the thermosetting polymer emulsion before or after irradiation, if necessary.

The irradiation may be effected within the temperature range over which the emulsion is stable. The irradiation may be effected in, preferably, an inert atmosphere, but also may be effected at room temperature in air. In any event, the radiation atmosphere and the radiation temperature are not restricted.

This invention is further illustrated by the following Examples. However, this invention should not be limited by these examples, and changes and modifications within the spirit and scope of the claims can be effected. The percent and parts in the Examples are based on weight unless otherwise specified.

EXAMPLE 1

A polymer emulsion (hereunder referred to as Em-1) containing 33 wt% of a copolymer of ethylacrylate and methylol methacrylamide (molar ratio of 88:12) was prepared according to the conventional catalytic emulsion polymerization. A thermosetting acryl emulsion (hereunder referred to as Em-2) was prepared by sufficiently agitating a mixture of 100 parts of Em-1, 4 parts of a crosslinking agent diglycidyl and 1 part of a curing catalyst triethanol amine.

A sample of 15 cc of Em-2 was put in a test tube and sealed with a rubber cap, and was irradiated with gamma rays from Co-60 for 5 hours at a dose rate of 1 Mrad/hr. After it was confirmed that the viscosity of the irradiated emulsion had not increased, the emulsion was coated into a glass plate and left standing at room temperature for 1 hour, followed by drying with heat in a recycling constant temperature air bath to obtain a film 100μ thick.

Table 2 shows the temperature and time for drying, gel percent, breaking strength, elongation, water-resistance and anti-xylol Activity of the film.

Reference Example 1

A film was prepared by drying Em-2 with heat under the same conditions as those employed in Example 1, with the exception that said thermosetting acryl emulsion was not irradiated with radioactive rays. Table 2 also shows the physical properties of the film thus prepared.

Table 2

|           | Dose rate (Mrad) | Curing Temp. (°C) | Curing time (min.) |
|-----------|------------------|-------------------|--------------------|
| Example 1 | 5                | 150               | 20                 |
| Example 1 | 5                | 150               | 30                 |
| Example 1 | 5                | 180               | 20                 |
| Example 1 | 5                | 180               | 30                 |
| Ref. Ex. 1| 0                | 150               | 20                 |
| Ref. Ex. 1| 0                | 150               | 30                 |
| Ref. Ex. 1| 0                | 180               | 20                 |
| Ref. Ex. 1| 0                | 180               | 30                 |

|           | Gel*1) percent (%) | Breaking Strength*2) (Kg/cm$^2$) | Elongation*2) (%) | Water-absorption*3) (%) | Anti-xylol*4) Activity |
|-----------|--------------------|----------------------------------|-------------------|-------------------------|------------------------|
| Example 1 | 82                 | 181                              | 205               | 6.5                     | slightly whitened      |
| Example 1 | 89                 | 190                              | 180               | 4.8                     | no change              |
| Example 1 | 98                 | 210                              | 145               | 3.8                     | no change              |
| Example 1 | 99                 | 215                              | 140               | 3.0                     | no change              |

Table 2-continued

| | | | | | |
|---|---|---|---|---|---|
| Ref. Ex. 1 | 41 | 35 | 440 | 12.2 | whitened |
| Ref. Ex. 1 | 62 | 43 | 320 | 9.6 | whitened |
| Ref. Ex. 1 | 74 | 81 | 275 | 9.4 | whitened |
| Ref. Ex. 1 | 83 | 97 | 200 | 4.8 | slightly whitened |

[*1)] $W_1$ g of the film was boiled in acetone for 48 hours to obtain a dry weight of $M_2$ g. Gel percent (%) was calculated from $(W_2/W_1) \times 100$.
[*2)] A film (10 × 100 mm) was stretched by a tensile machine at a rate of 4 cm/sec at room temperature. Breaking strength was determined based on strain and elongation at the breaking point.
[*3)] $W_3$ g of the film was left standing in ion exchange water at a 20° C for 24 hours to obtain a weight $W_4$ g. Water absorption was calculated from $(W_4-W_3)/W_3$.
[*4)] The surface of the film was vigorously rubbed with xylene-containing gauze 20 times to observe a change in the surface.

EXAMPLE 2

An acrylic emulsion (hereunder referred to as Em-3) containing 20 wt% of a copolymer of ethyl acrylate and acrylic acid (molar ratio of 90:10) was prepared according to the conventional catalytic emulsion polymerization. A thermosetting acrylic emulsion (hereunder referred to as Em-4) was prepared by sufficiently agitating a mixture of Em-3 with 2/3 mol equivalent of a polymer crosslinking agent hexamethoxymethylolamine based on the carboxyl group in the Em-3.

A sample of 6 cc of Em-4 was placed in an aluminum cup 50 mm in diameter, which was closed with an aluminum foil and irradiated with an electron beam of 1.5 MeV from above. Table 3 shows the physical properties of a film 200 μ thick that was prepared by drying the irradiated Em-4 with heat at 120° C. for 20 min. in accordance with the procedure of Example 1.

Reference Example 2

A film was prepared by drying Em-4 with heat at 120° C. for 20 min. in the manner described in Example 1, except that the Em-4 was not irradiated. Table 3 also shows the physical properties of the film thus obtained.

Table 3

| | Dose rate (Mrad) | Gel percent (%) | Breaking strength (Kg/cm²) | Water absorption (%) | Anti-xylol Activity |
|---|---|---|---|---|---|
| Example 2 | 1 | 87 | 155 | 9.2 | slightly whitened |
| Example 2 | 3 | 93 | 180 | 6.5 | no change |
| Example 2 | 5 | 95 | 210 | 5.8 | no change |
| Ref. Ex. 2 | 0 | 73 | 95 | 16.0 | whitened |

EXAMPLE 3

A polymer emulsion (hereunder referred to as Em-5) containing 35% of a copolymer of vinyl acetate and glycidyl methacrylate (molar ratio of 9:1) was prepared according to the conventional radiation emulsion polymerization using gamma rays. After irradiation with gamma rays in the manner described in Example 1, Em-5 was mixed under sufficient agitation with 2⅔ mol equivalent of hexamethylene diamine based on the epoxide in Em-5 to obtain a polymer emulsion (hereunder referred to as Em-6). Said Em-6 was coated onto a glass plate, and dried at 40° C. for 5 hours to obtain a film 300 μ thick. Table 4 shows the physical properties of the film.

Reference Example 3

Em-5 was mixed under sufficient agitation with ⅔ mole equivalent of hexamethylene diamine based on the epoxide in Em-5 to prepare a polymer emulsion (Em-7). Table 4 also shows the physical properties of a film prepared by drying Em-7 in the manner described in Example 1.

Table 4

| | Dose Rate (Mrad) | Gel Percent (%) | Breaking Strength (Kg/cm²) | Water-Absorption (%) | Anti-xylol Activity |
|---|---|---|---|---|---|
| Example 3 | 3 | 94 | 154 | 2.7 | no change |
| Example 3 | 6 | 97 | 181 | 2.0 | no change |
| Ref. Ex. 3 | 0 | 64 | 93 | 4.2 | slightly whitened |

EXAMPLE 4

A polymer emulsion containing 33 wt% of a copolymer of ethyl acrylate and methylol methacrylate (molar ratio of 88:12) was prepared according to the conventional catalytic emulsion polymerization. A sample of 100 parts of the resulting emulsion was mixed with 4 parts by a crosslinking agent diglycidyl ether and 1 part of a curing catalyst triethanol amine, and sufficiently agitated to prepare a thermosetting acryl emulsion (hereunder referred to as Em-8). A sample of 100 parts of Em-8 was mixed with 1 part of a lipophylic polyfunctional monomer triallyltrimellite (TATM) under sufficient agitation to prepare a polymer emulsion Em-9. Em-9 was proportioned in a bubble viscometer (JIS K 5400) and irradiated with gamma rays from Co-60 for total dose of 1.0 Mrad at room temperature. No change was observed in the viscosity of the emulsion when it was determined by a bubble viscometer. The irradiated Em-9 was coated on a glass plate, dried in air at room temperature for 1 hour, and dried with heat in a recycling constant temperature air bath to produce a film 100 μ thick.

Table 5 shows the drying conditions and physical properties of the film.

Reference Example 4

To prove the effect of addition of the polyfunctional monomer, Em-8 was subjected to the same test as that described in Example 4. Table 5 shows the results of this test.

Table 5

| | Curing Temp. (° C) | Curing Time (min.) | Gel Percent (%) | Breaking Strength (Kg/cm²) | Water Absorption (%) | Anti-xylol Activity | Luster [*5)] |
|---|---|---|---|---|---|---|---|
| Example 4 | 150 | 20 | 90 | 190 | 4.8 | no change | 74 |
| Example 4 | 150 | 30 | 97 | 205 | 3.6 | no change | 78 |

Table 5-continued

|  | Curing Temp. (° C) | Curing Time (min.) | Gel Percent (%) | Breaking Strength (Kg/cm$^2$) | Water Absorption (%) | Anti-xylol Activity | Luster [*5] |
|---|---|---|---|---|---|---|---|
| Example 4 | 180 | 20 | 99 | 220 | 3.2 | no change | 85 |
| Example 4 | 180 | 30 | 99 | 245 | 2.4 | no change | 85 |
| Ref. Ex. 4 | 150 | 30 | 75 | 78 | 8.9 | whitened | 69 |
| Ref. Ex. 4 | 180 | 30 | 87 | 110 | 4.3 | whitened | 70 |

[*5] Reflection of the film observed at 60 degrees in accordance with JIS K 5400.

EXAMPLE 5

An emulsion (conc. 30%) terpolymer of isobutyl methacrylate, 2-hydroxyethyl methacrylate and methacrylic acid (molar ratio of 90:8:2) was synthesized according to the catalytic emulsion polymerization in the manner described in Example 4. A sample of 100 parts of the emulsion was mixed with 3 parts of hexamethoxymethylol melamine to obtain a thermosetting acryl emulsion (hereunder referred to as Em-10). A sample of 100 parts of Em-10 was mixed with 3 parts of tetramethylene glycol diacrylate (4G) under agitation by a diperser mixer. The resulting emulsion was irradiated with 3 MR of gamma rays from Co-60 in the manner described in Example 4. The irradiated thermosetting acryl emulsion was coated onto a glass plate, dried for 3 hours at room temperature, and heat set at 160° C. for 20 minutes to obtain a film 100μ thick. Table 5 shows the gel percent, breaking strength, water absorption and anti-xylol activity of the film determined in the manner described in Example 4.

Reference Example 5

Em-10 used in Example 5 was irradiated and cured by heat in the manner described in Example 3 with the exception that 4G was not added. Table 6 shows the physical properties of the film thus obtained.

Table 6

|  | Gel Percent (%) | Breaking Strength (Kg/cm$^2$) | Absorption (%) | Anti-xylol Activity |
|---|---|---|---|---|
| Example 5 | 91 | 183 | 2.3 | no change |
| Ref. Ex. 5 | 34 | 95 | 8.7 | whitened |

EXAMPLE 6

A polymer emulsion (Em-11) containing 30 wt% of a copolymer of vinyl acetate and glycidyl methacrylate (molar ratio of 9:1) was prepared according to the conventional radiation emulsion polymerization using gamma rays. A sample of 100 parts by weight of Em-11 was mixed with 0.5 parts of a lipophylic polyfunctional monomer, neopentyl glycol dimethacrylate (NPG), to obtain a polymer emulsion Em-12.

A sample of 6 cc of Em-12 was placed in an aluminum cup 50 mm in diameter, which was closed with aluminum foil, and irradiated from above with an electron beam of 1.5 MeV for a total dose of 2 Mrad. Thereafter, ⅓ mole equivalent of hexamethylene diamine based on the epoxide in Em-11 was added, and the mixture was sufficiently agitated, coated on a glass plate, and dried at 40° C. for 5 hours to obtain a film 100μ thick. Table 7 shows the physical properties of the resulting film.

REFERENCE EXAMPLE 6

Em-11 used in Example 6 was irradiated with a total dose of 2 Mrad, mixed with hexamethylene diamine, and dried in the manner described in Example 6, with the exception that NPG was not added. Table 7 shows the physical properties of the film obtained.

Table 7

|  | Gel Percent (%) | Breaking Strength (Kg/cm$^2$) | Absorption (%) | Anti-xylol Activity |
|---|---|---|---|---|
| Example 6 | 97 | 181 | 5.4 | no change |
| Ref. Ex. 6 | 87 | 125 | 12.3 | whitened |

EXAMPLE 7

Ethyl acrylate was copolymerized with 2-hydroxyl ethyl methacrylate according to the conventional catalytic emulsion polymerization to obtain a copolymer emulsion Em-12 (30% solid content, 10% of 2-hydroxyethylmethacrylate in the resin component).

A sample of 200 g of Em-12 was put in a 300 cc conical flask and mixed with 4 g of diethylene glycol dimethacrylate (2G) under sufficient agitation. Thereafter, nitrogen gas was bubbled for 20 minutes followed by sealing, and irradiating with Cs-137 for a total dose of 1 Mrad at room temperature. The irradited emulsion was designated Em-13.

Em-13 was dissolved in an aqueous solution of Cymel 303 (melamine resin of Mitsui Toatsu) in water and ethanol (40% melamine content) and sufficiently agitated. The mixture was coated onto a glass plate, left standing at room temperature for 2 hours, dried by heat in a hot air recycling constant temperature air bath to obtain a film 100μ thick.

Table 8 shows the baking conditions and the physical properties of the film. The method of determining the physical properties was in accord with that described in Example 4.

REFERENCE EXAMPLE 7

Em-12 was dissolved in said aqueous solution of Cymel 303 in water and ethanol, and sufficiently agitated. The mixture was coated onto a glass plate and baked in the manner described in Example 7 to obtain a film 100μ thick. Table 8 shows the physical properties of the film that was subjected to the same test as that described in Example 7.

Table 8

|  | Melamine [*6] Content | Curing Temp. (° C) | Curing Time (min.) | Gel Percent (%) | Breaking Strength (Kg/cm$^2$) | Water Resistance (%) | Anti-xylol Activity | Luster |
|---|---|---|---|---|---|---|---|---|
| Example 7 | 1 | 130 | 30 | 72.5 | 180 | 3.5 | no change | 81 |
| Example 7 | 1 | 160 | 20 | 91.3 | 210 | 2.0 | no change | 85 |
| Example 7 | ½ | 160 | 30 | 62.5 | 145 | 2.3 | no change | 79 |

Table 8-continued

| | Melamine [6] Content | Curing Temp. (°C) | Curing Time (min.) | Gel Percent (%) | Breaking Strength (Kg/cm²) | Water Resistance (%) | Anti-xylol Activity | Luster |
|---|---|---|---|---|---|---|---|---|
| Ref. Ex. 7 | 1 | 160 | 30 | 29.0 | 73 | 7.5 | whitened | 73 |

[6] Melamine content represents the proportion by weight of the melamine to 2-hydroxyethyl methacrylate in the resin component.

What is claimed is:

1. A process for preparing a heat-curable polymer emulsion which in cured condition has improved water resistance, chemical resistance and toughness, comprising adding 0.01 to 20% by weight of a lipophilic polyfunctional monomer to a thermosettable polymer emulsion, and irradiating with an ionizing radiation with the total dose of irradiation being 0.1 M rad to 50 M rad;

wherein the thermosettable polymer emulsion comprises at least one homopolymer of a monomer having one or more functional groups selected from the group consisting of epoxide, amino, anhydro, carboxyl, carboxyl, hydroxyl and methylol, or a copolymer of two of said monomers, or a copolymer of a said monomer with another polymerizable vinyl monomer as disperse phase with the proviso that said functional groups be present such to provide a thermosettable polymer emulsion; and wherein the lipophilic polyfunctional monomer has low solubility in water at room temperature, good compatibility with the thermosettable polymer emulsion and at least two reactive carbon-to-carbon double or triple bonds.

2. The process as defined in claim 1 wherein the polymer of said thermosettable polymer emulsion is selected from the group consisting of a homopolymer of a radiation-crosslinkable monomer, a copolymer thereof and a copolymer composed of more than 40% of radiation-crosslinkable monomer and less than 60% of radiation-disintegratable monomer.

3. The process as defined in claim 2 wherein the radiation-crosslinkable monomer is selected from the group consisting of acrylic ester, vinyl acetate, ethylene, vinyl chloride, butadiene, styrene, vinyl fluoride, vinylidene fluoride, and vinylidene chloride.

4. The process as defined in claim 2 wherein the radiation-disintegratable monomer is selected from the group consisting of methacrylate, isoprene and tetrafluoroethylene.

5. The process as defined in claim 1 wherein the ionizing radiation is selected from the group consisting of electron beam, alpha rays, beta rays, gamma rays, and X-rays.

6. A process as defined in claim 1 wherein the lipophilic polyfunctional monomer is selected from the group consisting of

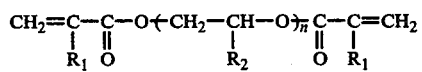

(a)

wherein $R_1$ and $R_2$ represent hydrogen or methyl group respectively, and n is a positive integer below 9,

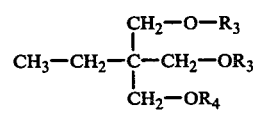

(b)

wherein $R_3$ is

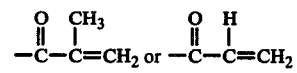

and $R_4$ is hydrogen or $R_3$,

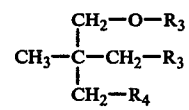

(c)

wherein $R_3$, $R_4$ are as defined in item (b), (d) $R_3$—O—$(CH_2)_n$—O—$R_3$ wherein $R_3$ is as defined in item (b) and n is a positive integer above 4,

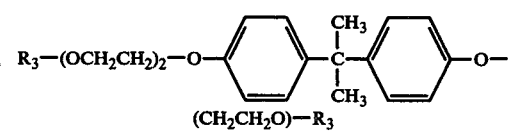

(e)

wherein $R_3$ is as defined in item (b),

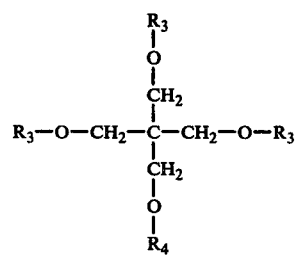

(f)

wherein $R_3$ and $R_4$ are as defined in item (b),

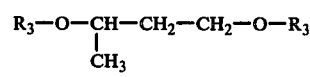

(g)

wherein $R_3$ is as defined in item (b),

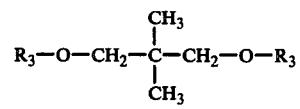

(h)

wherein $R_3$ is as defined in item (b), (i) diallyl compounds selected from the group consisting of diallyl maleate, diallyl fumarate, diallyl itaconate and diallyl phthalate, (j) triallyl compounds selected from the group consisting of triallyl isocyanurate, triallyl cyanurate and triallyl trimellitate, (k) divinyl benzene, and (l) di or tripropargylic acid ester.

* * * * *